(12) United States Patent
Chiu et al.

(10) Patent No.: US 7,581,742 B2
(45) Date of Patent: Sep. 1, 2009

(54) PEDAL SCOOTER

(76) Inventors: Po-Lin Chiu, No. 135, Li da Rd., Zuoyung District, Kaohsiung City 813 (TW); Shern-Ji Tsay, No. 33, Lane 109, Nenjiang st., Sanmin District, Kaohsiung City 807 (TW); Ching Piao-Chang, No. 30, Lane 529, Wujia $2^{nd}$ Rd., Fongshan city, Kaoshiung County 830 (TW)

( * ) Notice: Subject to any disclaimer, the term of this patent is extended or adjusted under 35 U.S.C. 154(b) by 236 days.

(21) Appl. No.: 11/549,255

(22) Filed: Oct. 13, 2006

(65) Prior Publication Data

US 2008/0088109 A1    Apr. 17, 2008

(51) Int. Cl.
*B62M 1/10* (2006.01)
(52) U.S. Cl. ........................................ 280/252; 280/255
(58) Field of Classification Search .............. 280/87.01, 280/87.021, 87.041, 252–258, 1.175, 220, 280/221, 224
See application file for complete search history.

(56) References Cited

U.S. PATENT DOCUMENTS

| 1,014,279 | A | * | 1/1912 | Auger | 280/221 |
| 5,528,945 | A | * | 6/1996 | Okada | 74/7 A |
| 5,816,377 | A | * | 10/1998 | Nakamura | 192/64 |
| 6,334,838 | B1 | * | 1/2002 | Lee | 482/51 |
| 6,857,648 | B2 | * | 2/2005 | Mehmet | 280/217 |
| 2001/0054257 | A1 | * | 12/2001 | Wygle et al. | 49/349 |

* cited by examiner

*Primary Examiner*—Lesley D Morris
*Assistant Examiner*—Levon J. Fiore
(74) *Attorney, Agent, or Firm*—Banger Shia (57) ABSTRACT

The present invention relates to the drive assembly coupled with the pedal thereon the frame, and the transmission assemblies rotated by the drive assembly. Thereby to step on the pedal repeatedly rotates the transmission assemblies to make the wheel rotate in single direction. Therefore, the invention can first enhance the operating stability and then get the exercise effect while the user kicks the ground to propel the pedal scooter and steps on the pedal repeatedly.

2 Claims, 10 Drawing Sheets

PEDAL SCOOTER

BACKGROUND OF THE INVENTION

1. Field of the Invention

The present invention relates to a scooter. In particular, it relates to a pedal scooter with enhanced stability and durability.

2. Description of the Related Art

Figure 1:
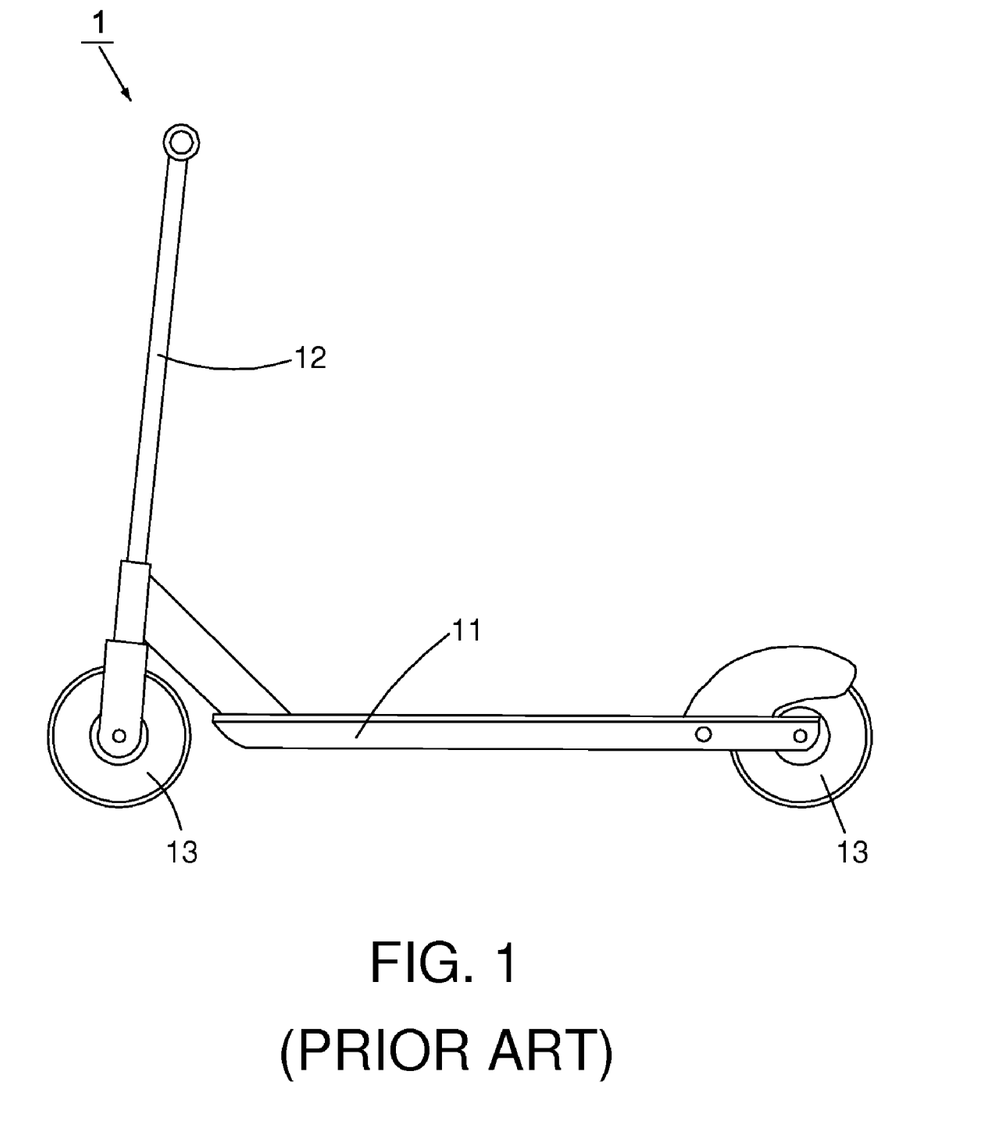
FIG. 1 is a plan view of a conventional scooter.

Referring to FIG. 1, a conventional scooter comprises a frame 11, a steering rod 12 and a pair of wheels 13; wherein the steering rod 12 is pivoted to the frame 11, and a handlebar 121 is disposed on the steering rod 12. The pair of wheels 13 is pivotally coupled to two sides of the frame 11; one of the wheels 13 is connected to the steering rod 12 for controlling the moving direction of the scooter. In operation, the user first propels the scooter to move forwards, when the moving speed becomes slower the user kicks on the ground with one foot to propel again. The aforesaid movement is repeated again and again to maintain the speed of the scooter. However, propelling with one foot has limitation in increasing the speed of the scooter; in addition, the balance of the scooter with one foot is not stable.

Figure 2:
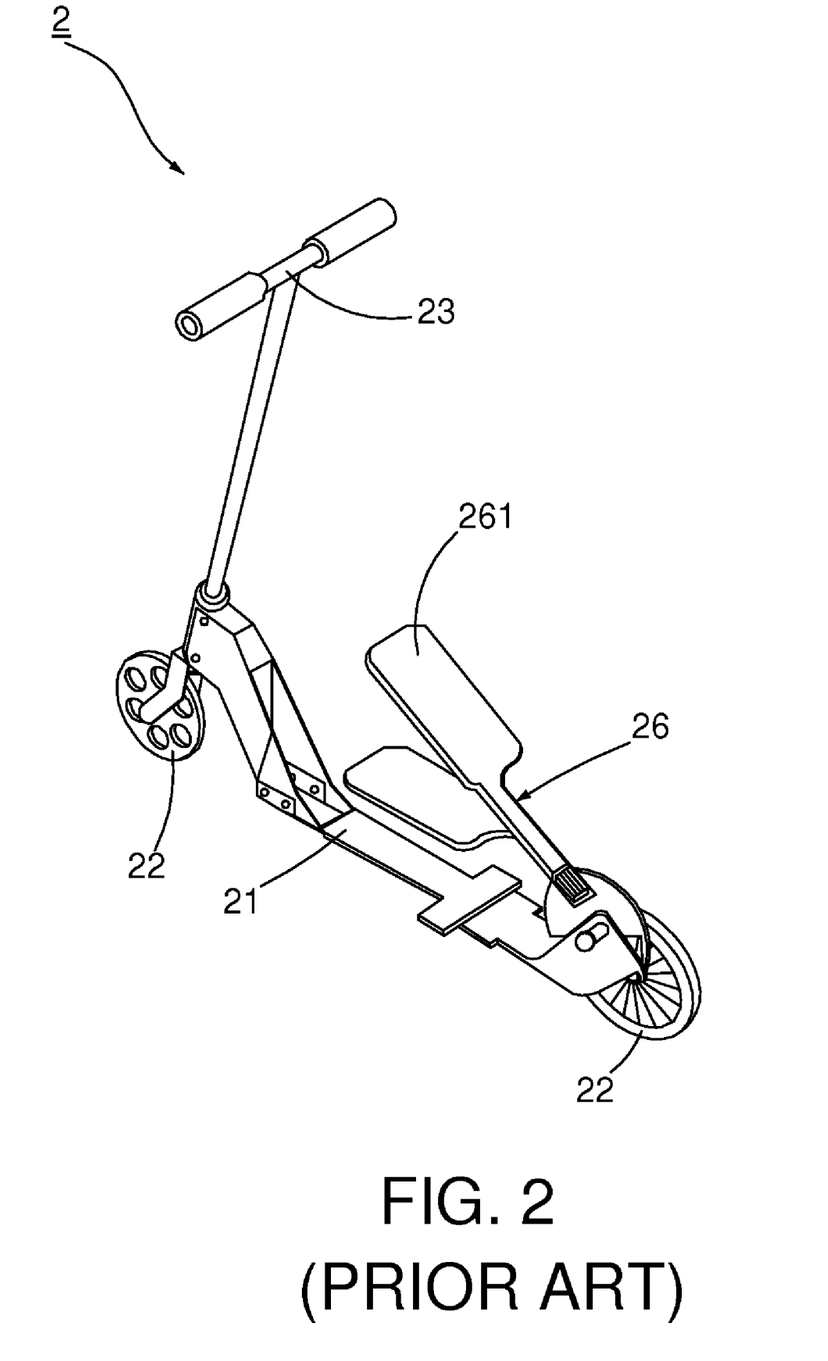
FIG. 2 is an another perspective view of a conventional power scooter.
Figure 3:
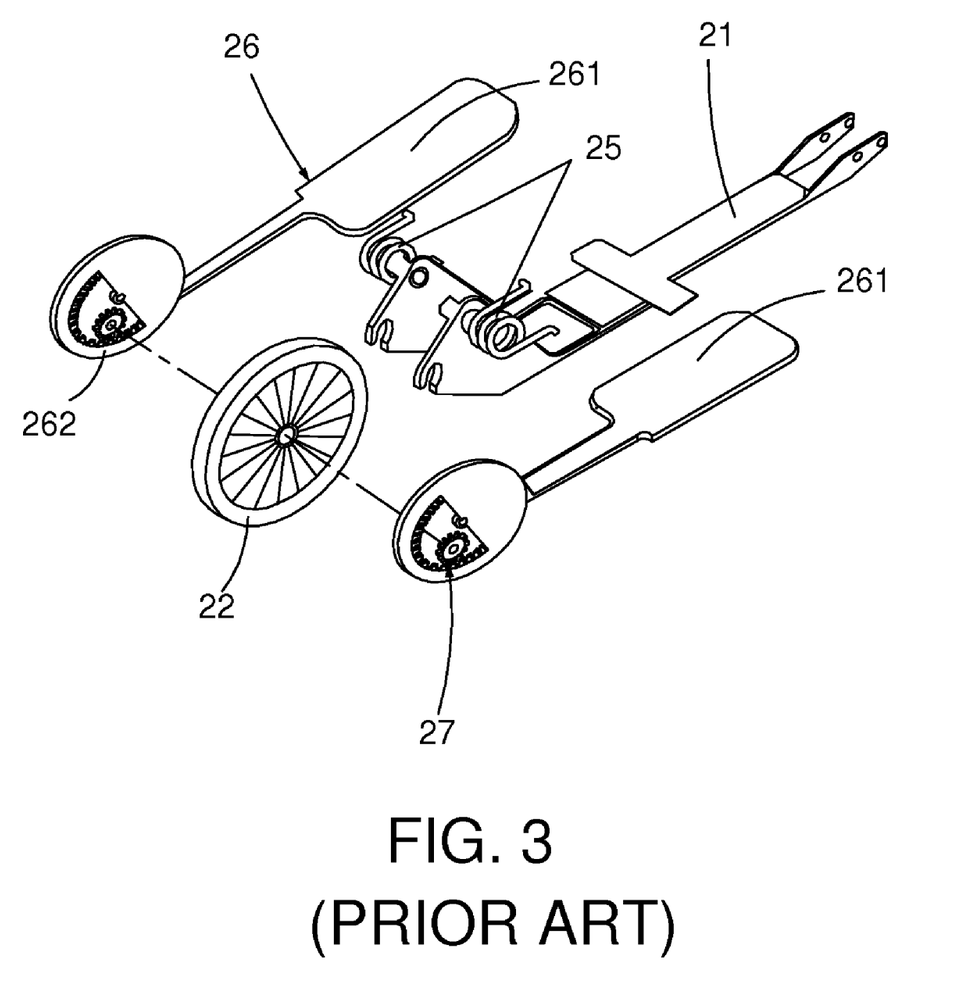
FIG. 3 is a perspective diagram showing the transmission structure of the conventional power scooter.

Accordingly, there is a prior art disclosed a power scooter with an improved transmission structure. Referring to FIGS. 2 and 3, the power scooter 2 comprises a frame 21, a pair of wheels 22 connected to the frame 21, a handlebar 23, an elastic body 25, a pedal assembly 26 and a one-way transmission bearing 27. The pedal assembly 26 comprises two pedals 261 disposed to both sides of the frame 21, and a transmission sprocket 262 extending from the pedals 261 and engaged with the one-way transmission bearing 27. Further, the one-way transmission bearing 27 and the wheel 22 are coupled together; therefore, while the one-way transmission bearing 27 rotates in a specific direction, it also rotates the wheel 22. Along with the elastic body 25 set between said frame 21 and said pedals 261, the pedals 261 will then be stepped repeatedly in operation.

While in use, repeat stepping on the pedals 261 drives the transmission sprocket 262 and the one-way transmission bearing 27 to rotate in a specific direction, which in turn further rotates the wheels 22 forwards. However, due to the two pedals 261 disposed on both sides of the frame 21, the space for standing is quite limited.

Due to the limited space for standing, it is quite difficult for a user to step on the pedals 261 for forward moving. While a user steps on the pedals 261 repeatedly, the frame 21 will be out of balance and shake. In addition, because the wheels 22 of conventional scooter are over small, safety becomes a concern.

SUMMARY OF THE INVENTION

The present invention provides a pedal scooter which relies on a user's weight for stepping on the pedal repeatedly for rotation power of wheels. The stepping process is stable and can achieve great exercising effect.

The present invention comprises a frame, a steering rod, a plurality of wheels, a drive assembly, and two transmission assemblies disposed on the frame. The drive assembly comprises a pedal pivotally disposed on the frame, and one elastic body connected between the pedal and the frame. Further, the transmission assemblies are disposed on both sides of the wheels of the frame; each of the aforesaid transmission assembly comprises a curved rack connected to the pedal, a first sprocket wheel engaging with the curved rack on the frame, a second sprocket wheel engaging with the first sprocket wheel, a third sprocket wheel disposed on the wheel and engaging with the second sprocket wheel, and a one-way transmission bearing disposed between the first and second sprocket wheels. Therefore, a user only needs to step on the pedal repeatedly, and the elastic body disposed between the pedal and the frame springs up and down to make the two transmission assemblies rotate, and make the wheels rotate. Accordingly, this invention has the benefit of being stable in operation and of achieving greater exercising effect.

BRIEF DESCRIPTION OF THE DRAWINGS

The accompanying drawing is included to provide a further understanding of the invention, and constitutes a part of this specification. The drawing illustrates an embodiment of the invention and, together with the description, serves to explain the principles of the invention. In the drawing.

DETAILED DESCRIPTION OF THE PREFERRED EMBODIMENTS

Figure 4:
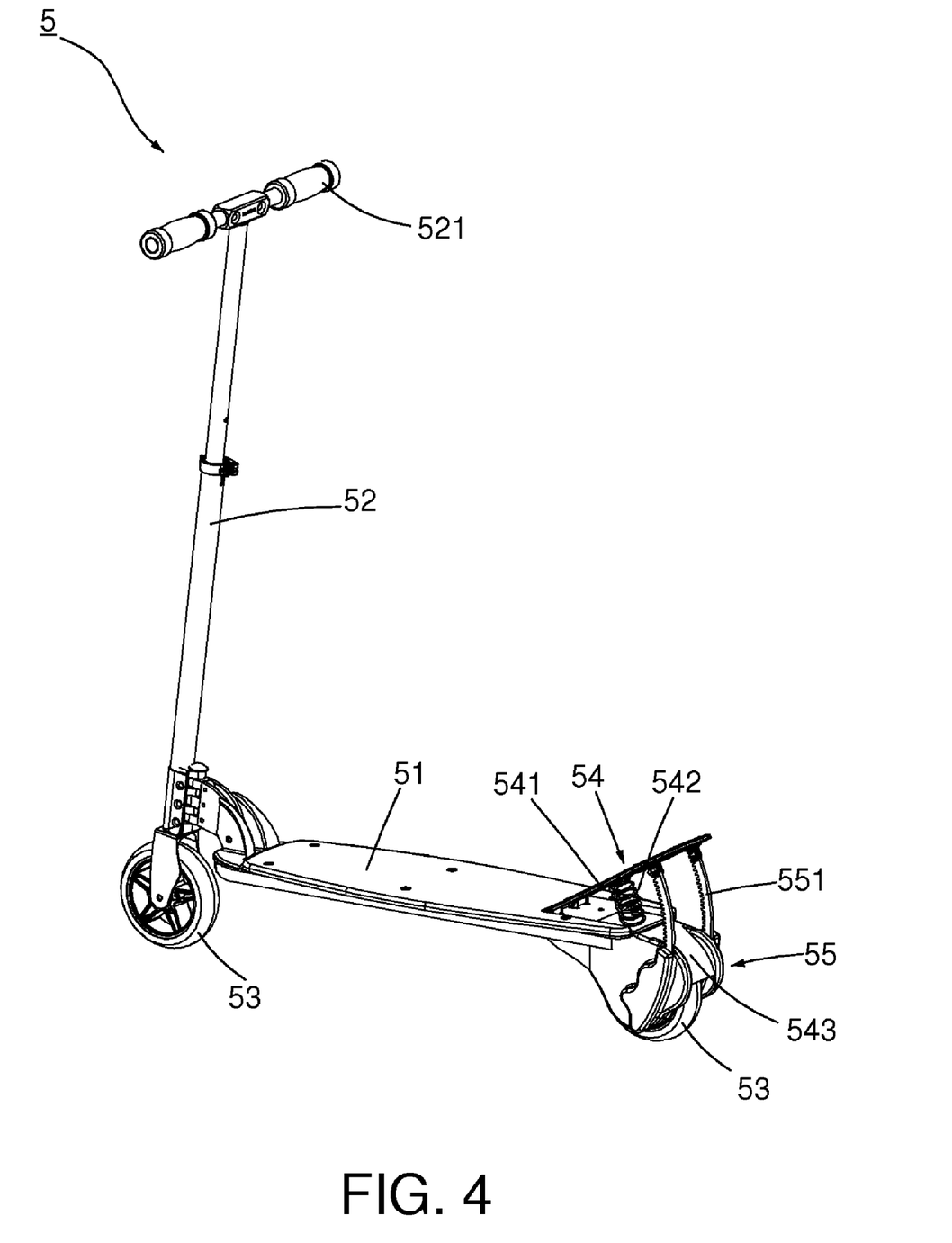
FIG. 4 is a perspective diagram showing a preferred embodiment of the present invention.

Referring to FIG. 4, the preferred embodiment of the present invention comprises one frame 51, one steering rod 52, a plurality of wheels 53, one drive assembly 54 and two transmission assemblies 55. The steering rod 52 is pivotally disposed on the frame 51, and the steering rod 52 is disposed on the handlebar 521. Further, the wheels 53 are pivotally coupled to the frame 51 and the steering rod 52 to control the advancing direction with the steering rod 52.

Figure 5:
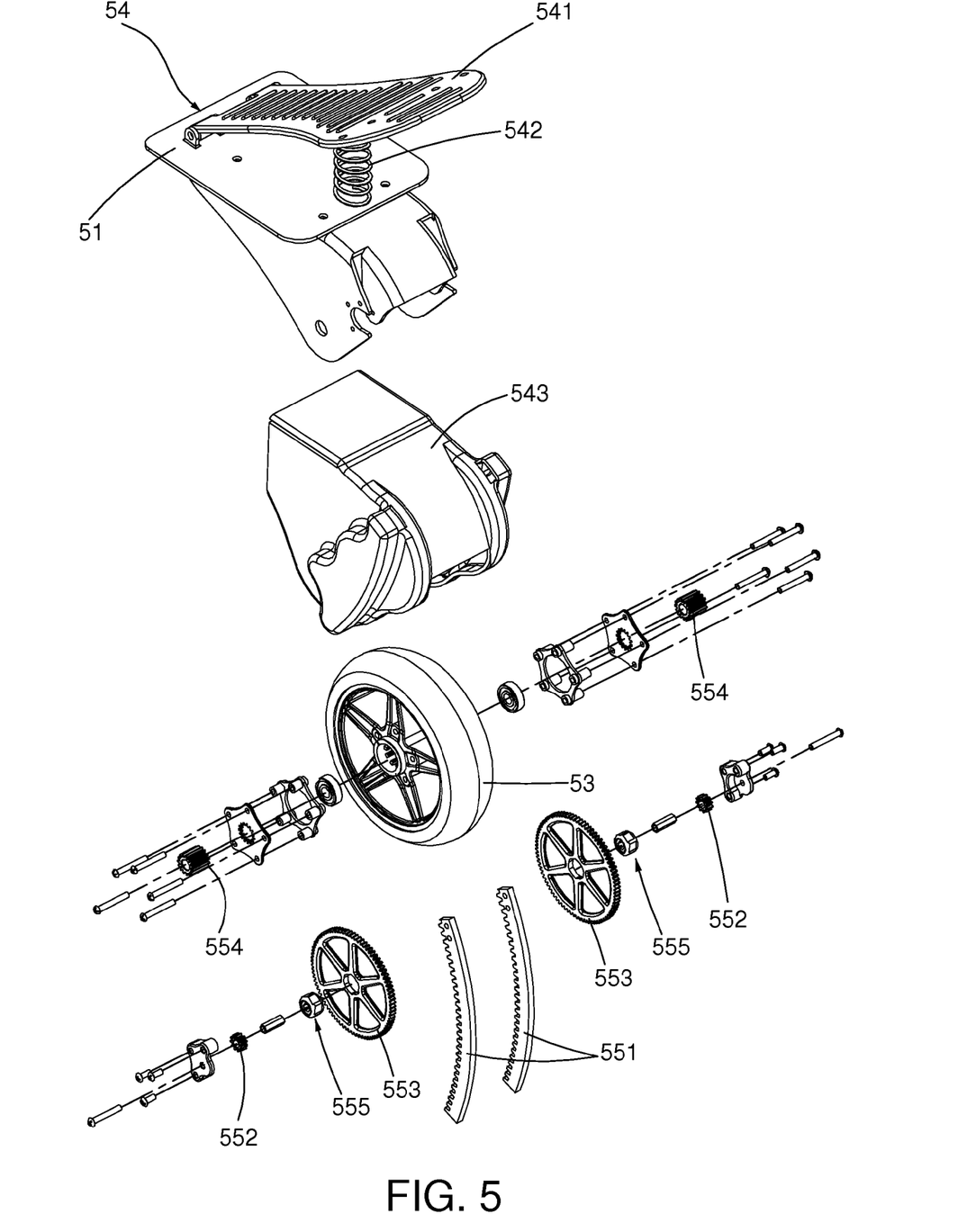
FIG. 5 is a perspective diagram showing the drive assembly and the transmission assembly of the present invention.

Referring to FIG. 5, the drive assembly 54 comprises one pedal 541 disposed on the frame 51 pivotally, and one elastic body 542(such as spring) coupled between the said pedal 541 and the said frame 51. A mudguard 543 is disposed on the frame 51 and extends to the wheel 53. While an external force applies to the pedal 541, it will return to the original position due to the reverse force of the elastic body 542. Meanwhile, the splash dirt from the wheel 53 will be blocked by the mudguard 543.

Figure 6:
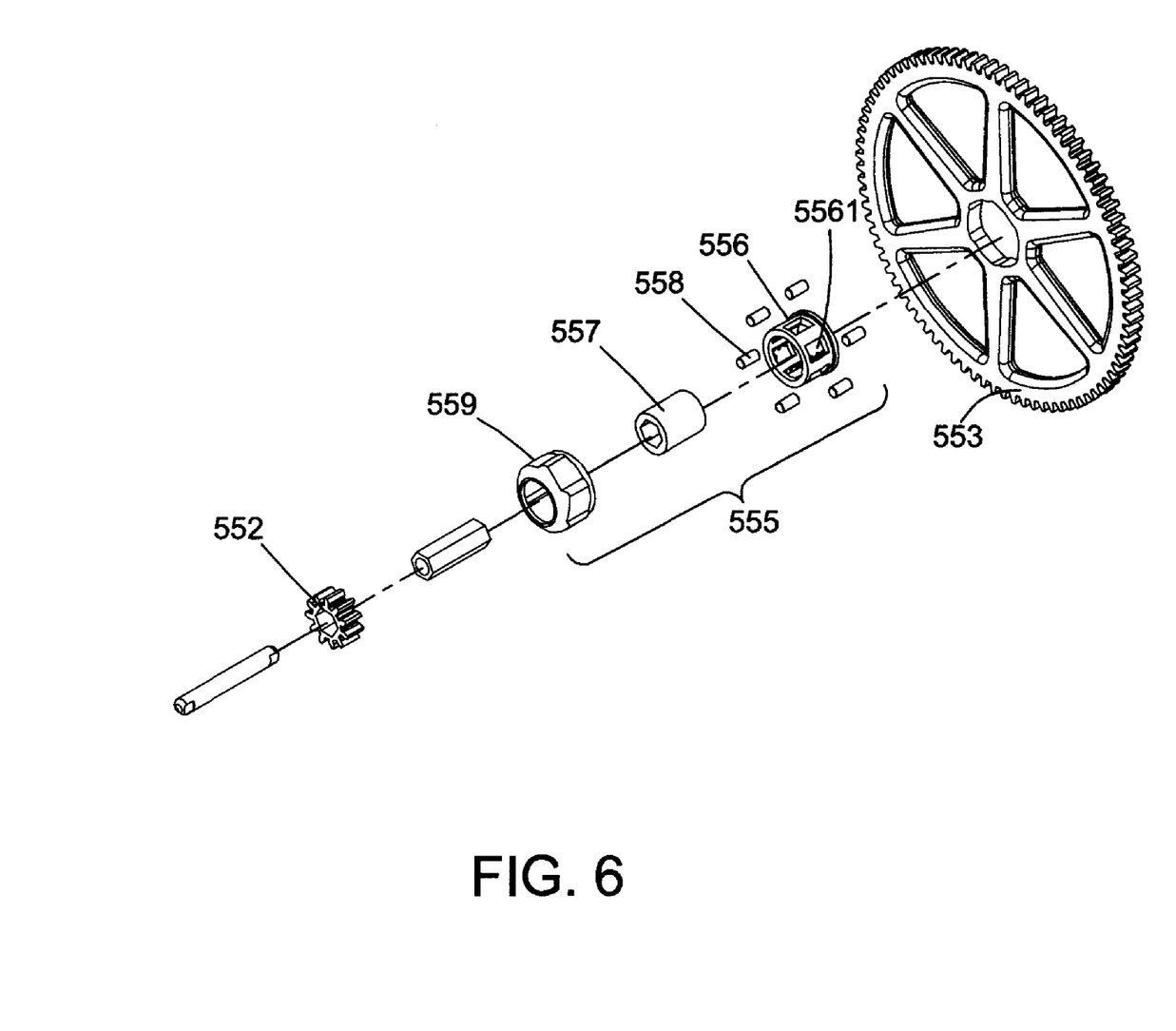
FIG. 6 is a perspective diagram showing the one-way transmission bearing of the present invention.

Referring to FIGS. 5 and 6, said two transmission assemblies 55 are disposed on each of the two sides of the said wheel 53. Each of the transmission assemblies 55 comprises a curved rack 551 connected to the pedal 541, a first sprocket wheel 552 engaged with the curved rack 551, a second sprocket wheel 553 engaged with the first sprocket wheel 552, a third sprocket wheel 554 disposed to the wheel 53 and engaged with the second sprocket wheel 553, and a one-way transmission bearing 555 disposed between the first and second sprocket wheels 552, 553.

Figure 7:
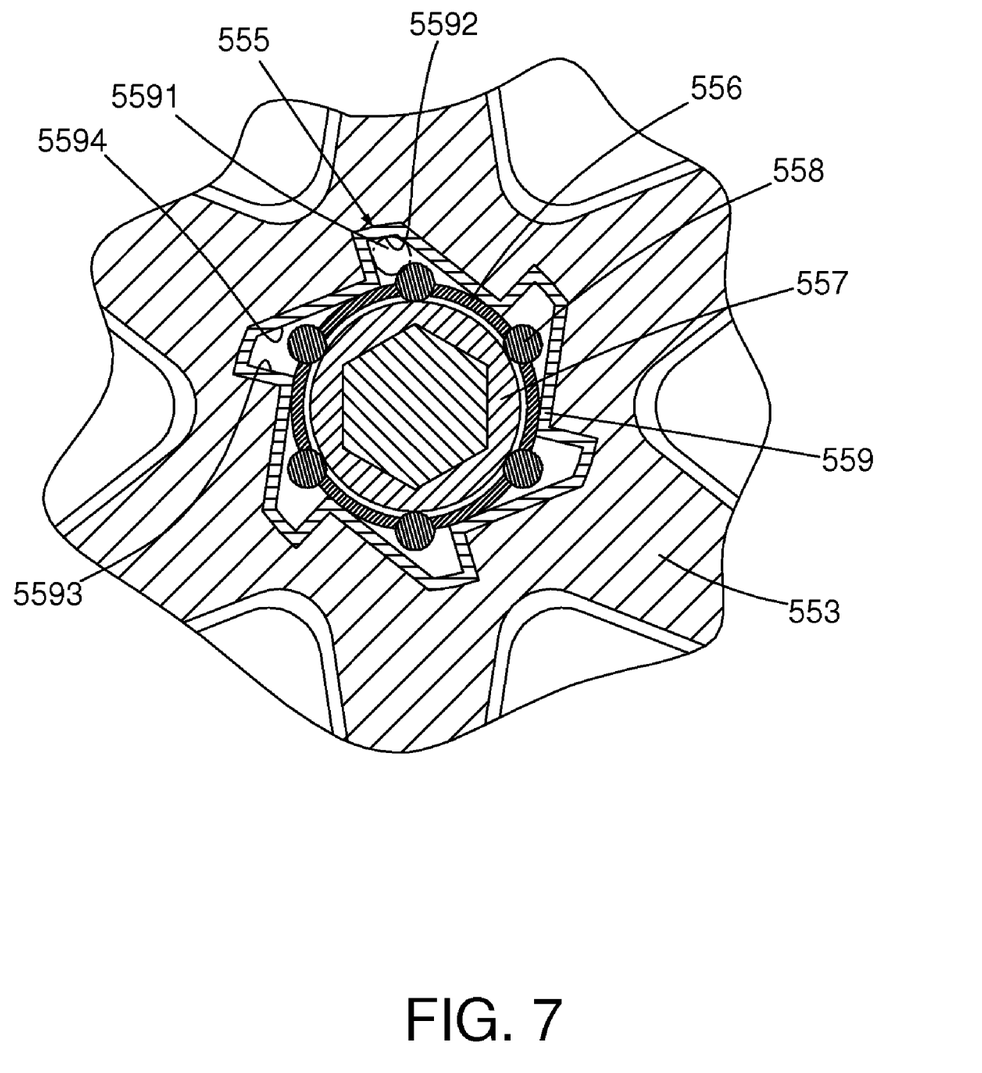
FIG. 7 is a cross-section view showing the one-way transmission bearing engaging with second sprocket wheel of the present invention.

Accompanying with FIG. 7, the aforesaid one-way transmission bearing 555 comprises a retaining sheath 556, a spindle 557 located through the retaining sheath 556, a plurality of rollers 558 disposed in the retaining sheath 556, and a rotated sheath 559 disposed outside the retaining sheath 556 and driven by the second sprocket wheel 553. The retaining sheath 556 has a plurality of apertures 5561 thereon to retain the said rollers 558. A plurality of recesses 5591 are disposed inside the rotated sheath 559. Furthermore, each said recess 5591 has a bottom wall 5592, a side surface 5593 extending upwardly from the bottom wall 5592, and an inclined surface 5594 extending upwardly from the bottom wall 5592 and connecting with the side surface 5593 at the adjacent recess.

While the second sprocket wheel 553 is operating, the first sprocket wheel 552 rotates, which in turn pushes the spindle 557 circling, further to make the rollers 558 move toward the inclined surface 5594, and finally get held in between the space between the spindle 557 and inclined surface 5594. Thus, the first sprocket wheel 552 delivers power through the roller 558 to push the second sprocket wheel 553. In contrast, while circling in counter-clockwise direction, the spindle 557 pushes rollers 558 into the recesses 5591 (as the imagination line showing). Therefore, the power of the first sprocket wheel 552 can not deliver through the rollers 558, causing the first sprocket wheel 552 idling.

Figure 8:
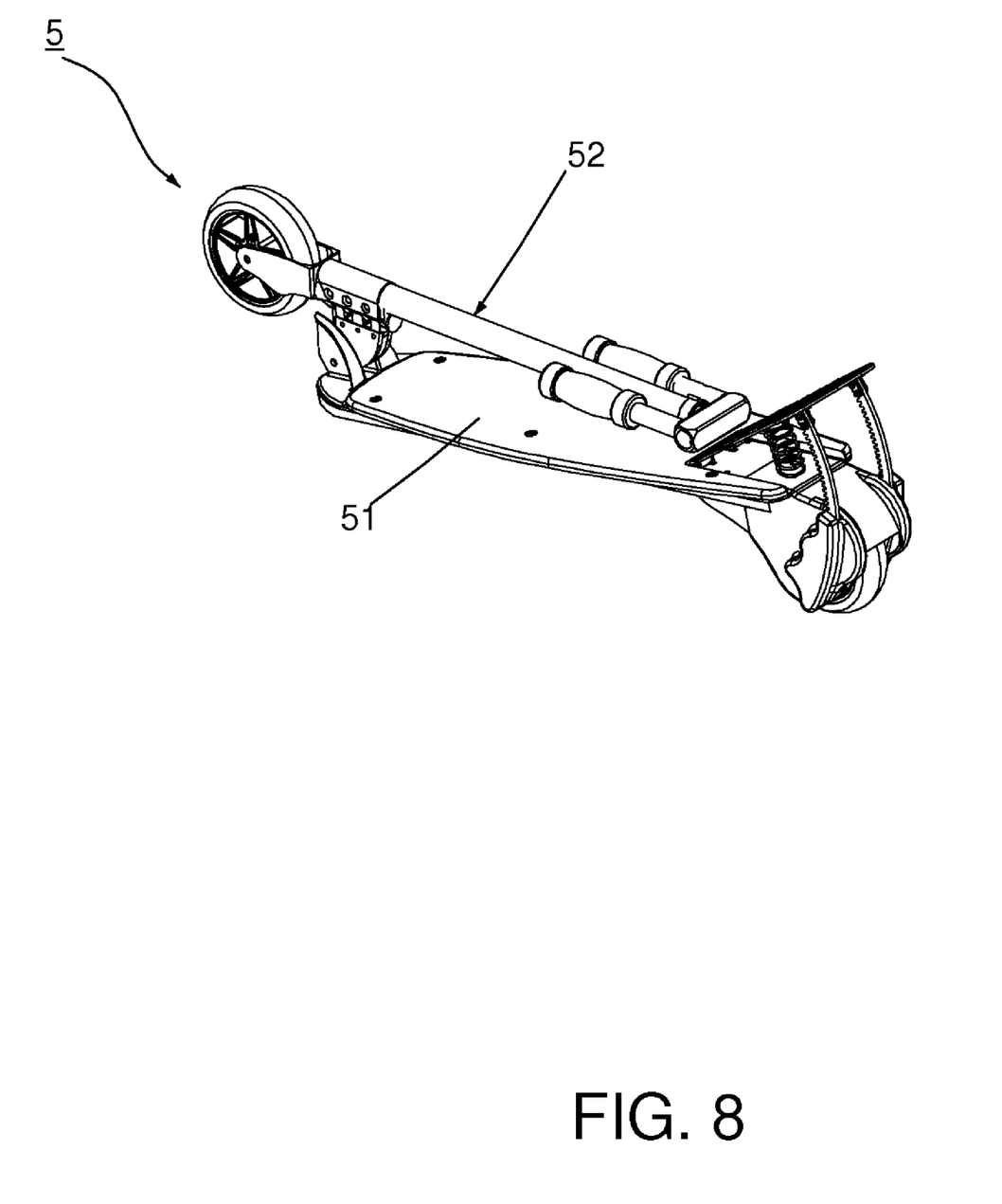
FIG. 8 is perspective diagram showing the present invention being folded according to the preferred embodiment.
Figure 9:
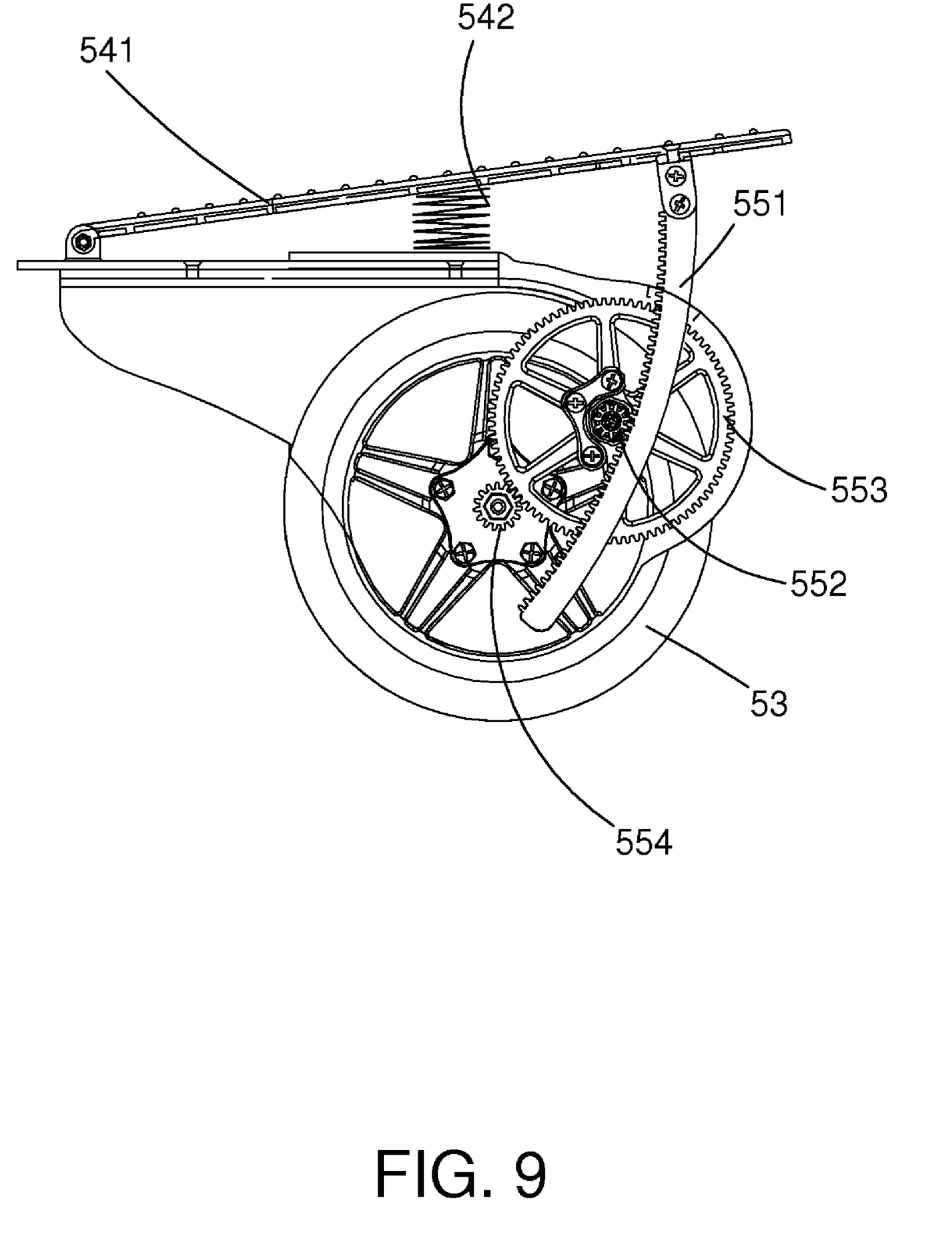
FIGS. 9 and 10 is a perspective view showing the transmission assembly rotating of the present invention.
Figure 10:
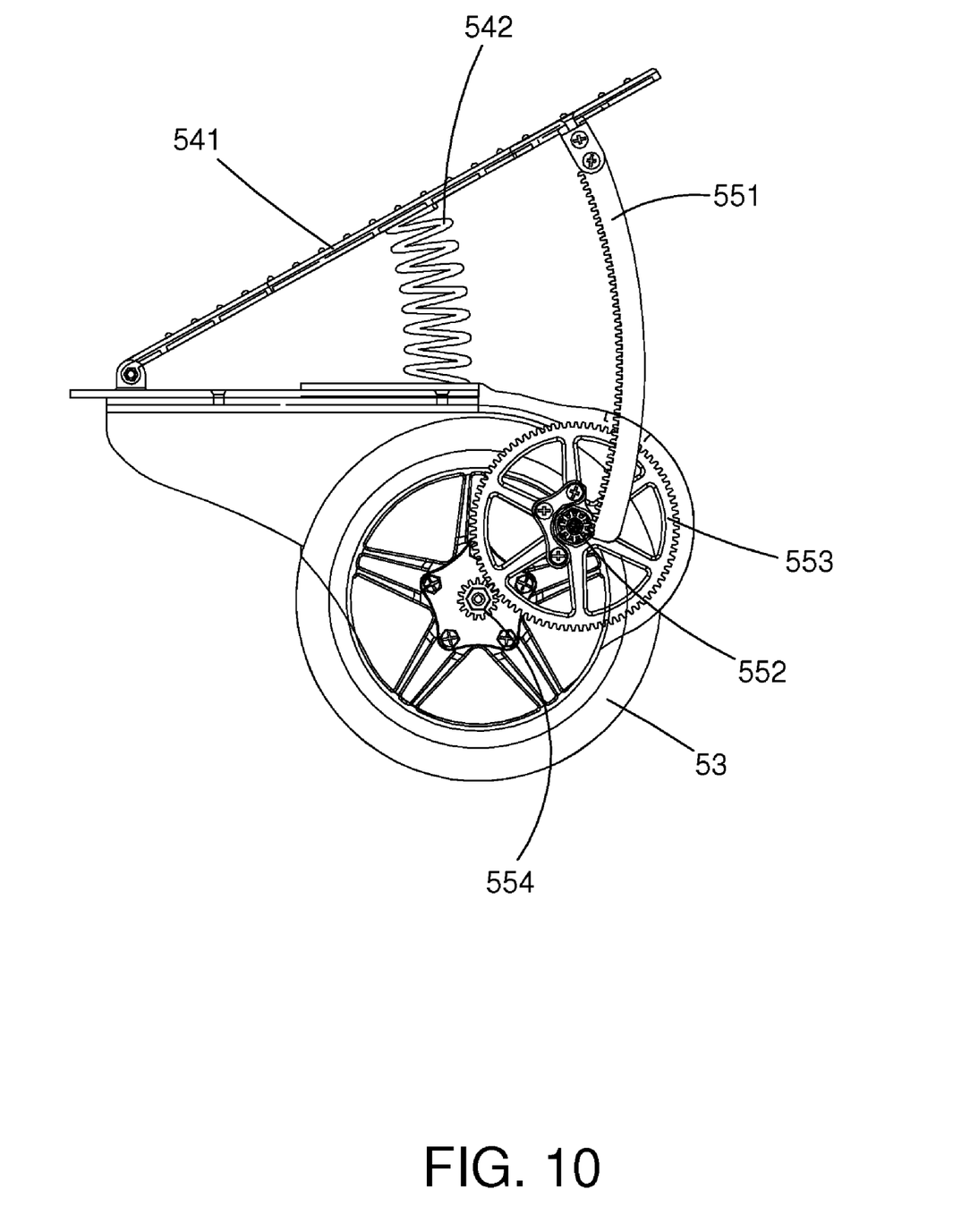

Referring to FIG. 8, while the pedal scooter 5 is not used, the steering rod 52 can be bent down to connect with frame 51 for convenient storage. When in use, a user only needs to pull up the steering rod 52 so the pedal scooter 5 can be unfold as showing in FIG. 4. Referring to FIG. 9, the user holds the steering rod 52 in hand to control the moving direction. Further, the user steps on the pedal 541 with one foot as the interlock state showing in FIG. 9 and 10. That is, relying on the reversing power of the elastic body 542 for supporting, the pedal 541 will be pushed upwardly to make the curved rack 551 move up and down to rotate the first sprocket wheel 552, which in turn pushes the second sprocket wheel 553 to rotate right away. The rotating of first sprocket wheel 552, which moves the second sprocket wheel 553, is made possible by the one-way transmission bearing 555 disposed between the two sprocket wheels; the one-way bearing 555 makes the first sprocket wheel 552 rotate the second sprocket wheel 553 in one direction only, not allowing for rotating in a reverse direction, which would counteract the rotating power of second sprocket wheel 553. As a result, the second sprocket wheel 553 moves the third sprocket wheel 554, which in turn rotates the wheel 53 as a forwarding power, enhancing the controlling stabilities while the two transmission assemblies 55 are still delivering power. In addition, a user's weight applied to the pedal repeatedly in operation also achieves the exercising effect.

To sum up, the invention makes use of the drive assembly to rotate the two transmission assemblies disposed on the frame; therefore, it could move the wheel rotate more stably than prior arts. Moreover, whenever a user wants to move the scooter forwards, he only needs to step on the drive assembly repeatedly to rotate the transmission assemblies for advancing the scooter, also achieving an exercising effect.

While we have shown and described the embodiment in accordance with the present invention, it should be clear to those skilled in the art that further embodiments may be made without departing from the scope of the present invention.

We claim:

1. A pedal scooter comprising:
   a frame, ground engaging rear and front wheels laying along longitudinal axis of the scooter and pivotally connected to opposite sides of the frame,
   a foldable handlebar connected to the front wheel for steering the scooter and a pedal connected to the rear wheel for driving the scooter,
   front portion of the pedal pivotally connected to the frame at a point forward of and above the rear wheel, wherein an elastic body is disposed at middle portion of the pedal between the pedal and the frame for elastically urging the pedal away from the frame,
   two transmission assemblies disposed on opposite sides of the rear wheel, each of the transmission assemblies comprises a curved gear rack, first, second and third sprocket wheels and a one way transmission bearing, wherein the gear racks are cojointly driven by the pedal;
   the gear rack being connected to a rear portion of the pedal and directly driving the first sprocket wheel, the third sprocket wheel non rotatably connected to the rear wheel and directly driven by the second sprocket wheel, the first and the second sprocket wheels having same rotational axis, the third sprocket wheel and the rear wheel having same rotational axis, and the radius of the second sprocket wheel is larger than each of the radiuses of the first and the third sprocket wheels,
   a one way transmission bearing disposed between the first and the second sprocket wheels for non rotatably engaging the first and the second sprocket wheels in response to driving operation of the pedal,
   the one way transmission bearing comprises plurality of recesses formed in the second sprocket wheel, plurality of rollers disposed in said recesses, and a retaining sheath having plurality of apertures for retaining the rollers.

2. The pedal scooter as claimed in claim 1, wherein a mudguard is disposed on the frame and extending to the wheel.

* * * * *